April 2, 1957 C. G. B. HAMMAR 2,787,519
CATALYTICAL REMOVAL OF FREE OXYGEN FROM GASES CONTAINING
FREE HYDROGEN AND HYDROGEN SULPHIDE
Filed Nov. 24, 1952
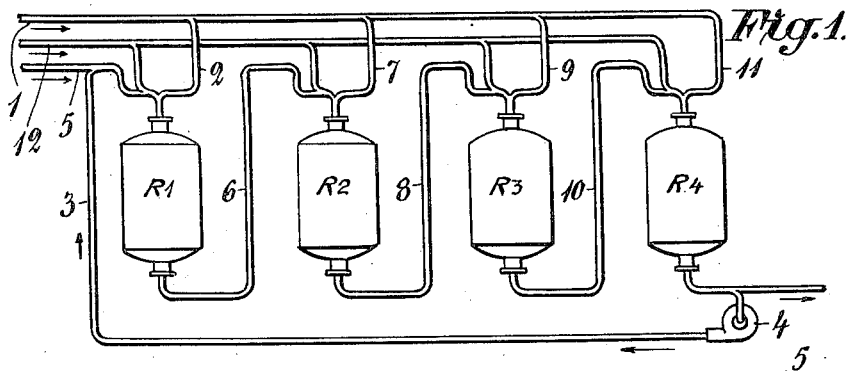
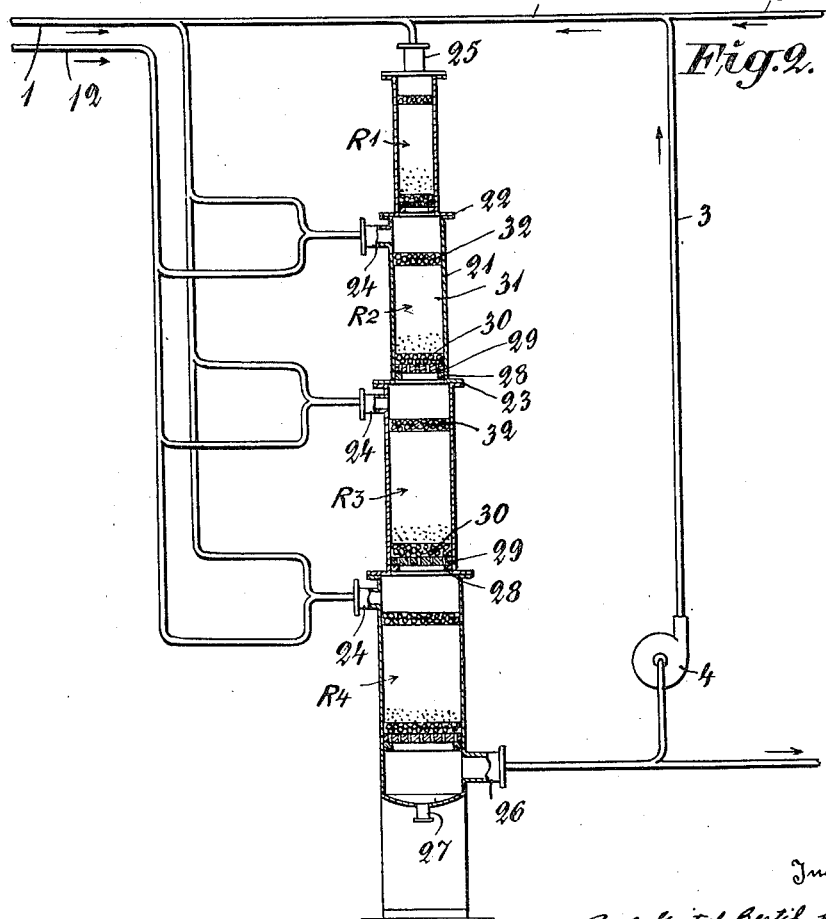
Inventor
Carl Gustaf Bertil Hammar,
By: Pierce, Scheffler & Parker
his Attorneys 2,787,519

CATALYTICAL REMOVAL OF FREE OXYGEN FROM GASES CONTAINING FREE HYDROGEN AND HYDROGEN SULPHIDE

Carl Gustaf Bertil Hammar, Kumla, Sweden, assignor to Svenska Skifferolje Aktiebolaget, Orebro, Sweden, a company of Sweden Application November 24, 1952, Serial No. 322,208

Claims priority, application Sweden November 12, 1952

11 Claims. (Cl. 23—3)

The present invention relates to the removal of free oxygen in a catalytical way from gases containing free hydrogen and, in addition, hydrogen sulphide, even in high concentration. Such gases are obtained i. e. in the dry distillation of, for instance, certain shales. In such distillation gases rich in hydrocarbons are obtained which contain, in addition to hydrogen and hydrogen sulphide, usually also other sulphur compounds, particularly mercaptans and carbonyl sulphide. It has been established that the binding of oxygen to hydrogen is highly accelerated by a catalyst mass comprising a first catalyst component containing at least one of the metals molybdenum and tungsten in the form of sulphide and/or oxide, a second catalyst component containing at least one of the metals iron, cobalt, nickel, chromium, vanadium, and uranium in the form of sulphide and/or oxide, and a carrier component based on alumina, silica gel, synthetic or natural aluminium silicate or mixtures thereof, the major portion of the catalyst mass consisting of the carrier component and the amounts of first catalyst component and second catalyst component being of the same order. The atomic ratio between the metals in the first and second catalyst components and the positive element of the carrier component should be

1–10:1–10:10–100 preferably be within the limits 0.5–1.5:0.5–1.5:10. A catalyst mass of this kind is more particularly described in the patent specification (patent application Serial No. 257,785). It has been found that this catalyst mass sometimes becomes highly polluted by sulphur separated out from the gas due to the fact that the catalyst also catalyzes the combustion of hydrogen sulphide to water and free sulphur. This drawback has appeared to take place particularly at high oxygen percentages.

A thorough investigation of the mechanism and kinetic of the reactions expected to take place in the system $H_2+H_2S+O_2$ at the catalytic removal of oxygen has disclosed that the following reactions and reaction velocities are to be reckoned with:

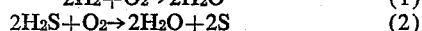
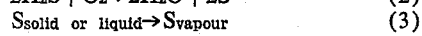

$$2H_2+O_2 \rightarrow 2H_2O \quad (1)$$
$$2H_2S+O_2 \rightarrow 2H_2O+2S \quad (2)$$
$$S_{solid\ or\ liquid} \rightarrow S_{vapour} \quad (3)$$
$$H_2+S \rightarrow H_2S \quad (4)$$

Here S is a symbol for the total amount of sulphur without specifying the distribution between $S_2$, $S_6$, and $S_8$ molecules that actually exists. The reaction kinetic investigation has shown that the reactions 1, 3, and 4 take place with velocities that are independent of the concentrations of oxygen or sulphur, respectively, while the velocity of the reaction 2 is directly proportional to the oxygen concentration. At low concentration sulphur that may have been deposited will therefore be removed from the catalyst as it is formed and a state of equilibrium is arrived at so that the amount of sulphur remains constant. If the oxygen concentration is increased, the formation of sulphur according to reaction 2 is increased, while the sulphur consumption according to reactions 3 and 4 remains constant. The result is that over a given oxygen concentration the total amount of sulphur on the catalyst increases perpetually so that the pores of the catalyst will ultimately be completely filled with sulphur leading to a successive lowering of the activity.

On the basis of the investigations made it has been possible to establish that for each catalyst accelerating the binding of oxygen with hydrogen in the system of $H_2+H_2S+O_2$, in any case when the concentration of $H_2S$ is equal to or higher than the concentration of $O_2$, the rule applies for each temperature that sulphur separates out only over a given oxygen concentration which is here called the critical concentration of oxygen. There is thus a material constant which is definite for each catalyst, at least at normal composition and speed of the gas. For a catalyst mass of the above type and having the following more precise composition:

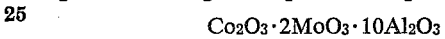

$$Co_2O_3 \cdot 2MoO_3 \cdot 10Al_2O_3$$

of the atomic ratio Co:Mo:Al=1:1:10 the critical concentration in percentage of volume has been found to be about 0.5 at 150° C., about 1.25 at 220° C., and about 1.5 at 350° C. by using available methods of measuring.

It has been found that when the oxygen concentration is lower than the critical concentration the length of life of the catalyst is very long and is only limited by a slight carbon deposit when shale distillation gases have been treated, while the activity of the catalyst decreases rapidly at oxygen percentages over the critical concentration as a consequence of the deposition of sulphur.

It has also been found that there is an optimum temperature. At essentially lower temperatures the critical concentration of oxygen is too low and at elevated temperatures side-reactions set in more and more which reactions consume hydrogen as well as badly affect the catalyst.

The present invention relates to a method for removing, by means of a catalyst accelerating the binding of oxygen to hydrogen, free oxygen from a raw-gas containing free hydrogen and hydrogen sulphide as well as oxygen in a concentration higher than the critical concentration of oxygen pertaining to the catalyst. The characteristic feature of the invention is the fact that the raw-gas is diluted with such a great quantity of gas poor in oxygen and having a percentage of oxygen essentially below the critical concentration, for instance, being free from oxygen, that the oxygen percentage of the gas mixture will be reduced to a value below the critical concentration at the reaction, carried out at a temperature between 150° C. and 350° C. The gas poor in oxygen may consist of steam, natural gas or cracking gas or mixtures thereof. With advantage raw-gas freed from oxygen in the process may be used alone or admixed with other gases.

An embodiment of the invention which has proved to be particularly advantageous consists in carrying out the process in a series of steps to which the raw-gas is supplied parallelly and for each step is admixed with gas poor in oxygen which at least in one step contains gas freed from oxygen in the process. The admixture at each step is accommodated in the process so that the oxygen concentration will be below the critical concentration. Hereby a considerable saving in plant and running costs for pressure rising machines, such as ventilators, blowing machines or compressors, pipings, heat exchangers, and reactors, can be attained. Such saving is attained more particularly if the raw-gas to the first step is admixed with gas poor in oxygen, preferably gas freed from oxygen in the process, for instance, from the last step, and the raw-gas to the other steps is admixed with gas freed from oxygen in the next preceding step, the number of steps and the quantity of gas poor in oxygen supplied to the first step being so accommodated that the percentage of oxygen in each step will be below the critical concentration.

In order to obtain adequate temperature conditions in the reactors it will usually be necessary to preheat the raw-gas more or less. As, however, the reaction is highly exothermic the heating must take place carefully. Therefore, according to one embodiment of the invention, it is preferred to supply the raw-gas to the reaction step in one preheated portion and one not preheated portion, the relative proportions of these portions being accommodated to the temperature and the quantity of the admixing gas poor in oxygen in such way that the temperature of the gas mixture will be the suitable one, for instance, at least 150° C. at the entrance of the step and not more than about 350° C. at the exit therefrom. Should the temperature appear to be too high at the exit it may thus easily be regulated by altering the proportions of preheated and not preheated raw-gas. The temperature of the gas at the exit of each step may also be regulated to the desired value by accommodating the number of steps and the amount of gas poor in oxygen supplied to the first step. Either the number of steps or the quantity of return gas may be chosen optionally, the other variable being determined by the provision that the critical concentration of oxygen must not be reached. Said choice is determined primarily by economical factors, such as the cost for reactors against costs for return passage of the gas.

The invention will now be described with reference to the attached drawings diagrammatically showing embodiments of a multiple-step process, it being understood, however, that this is merely an example of reducing the invention into practice.

In the drawing:

Fig. 1 illustrates a four-step process entirely diagrammatic and

Fig. 2 illustrates a vertical column of four reactor sections.

It is presumed in this example that a raw-gas containing about 2% oxygen, about 16% hydrogen, and about 20% hydrogen sulphide and the rest mainly hydrocarbons and nitrogen shall be treated. It has further been assumed that the percentage of oxygen has to be lowered to approximately one-half its value in order to be below the critical concentration. It is also assumed that, upon consideration of economical factors, it has been decided to carry out the process in four steps.

Raw-gas preheated to about 200° C. in a heat exchanger or heater (not shown in Fig. 1) enters through conduit 1. 7% of the raw-gas is introduced through conduit 2 to reactor R1. At the same time oxygen-free product gas from reactor R4 is recirculated by means of ventilator 4 and introduced through conduit 3. The ventilator may alternatively operate with cold gas in which case a cooler may be placed after reactor R4 and a heat exchanger or heater after the ventilator 4. These details are not shown in Fig. 1. Instead of or together with return gas some other oxygen-free gas, also preheated, may be introduced through conduit 5, e. g. steam, natural gas, cracking gases or the like. The total quantity of such oxygen-free gas is 7% of the quantity raw-gas supplied to all steps. The oxygen percentage in reactor R1 will thus be exactly half of the oxygen percentage in the entering raw-gas. The oxygen-free product from reactor R1 is passed through conduit 6 to reactor R2. To this reactor also 14% preheated raw-gas is introduced through conduit 7. In this manner the oxygen percentage is reduced also in reactor R2 to half its value. In the same way the product from reactor R2 is passed to reactor R3 where also 28% of the raw-gas is introduced and the oxygen percentage is thus lowered to half its value also in reactor R3. Finally, the product from reactor R3 is passed to reactor R4 in which the remainder of the gas, that is 51%, is also introduced, the oxygen percentage in reactor R4 being thereby reduced to somewhat below half its value. By this arrangement it is always possible to keep the oxygen concentration below the critical concentration and thus attain almost unlimited length of life of the catalyst. On the other hand, the total increase in temperature is not altered (at constant quantity of return gas) but this is dependent of the oxygen percentage and specific heat of the raw-gas only. If, therefore, gases of high oxygen percentages shall be treated it may happen that the total increase in temperature becomes so high that cracking temperature is reached and the catalyst is rapidly inactivated. This can obviously be prevented by inserting coolers for the product gas after each reactor but this requires large heating and cooling surfaces and involves expensive losses of heat. Another possible solution would be to lower the temperature of the raw gas entering from the heater. If in this manner overheating is avoided in one portion of the system, too low a temperature may be obtained, however, in another portion. Since even a relatively small reduction of the temperature below the optimum temperature, as shown by tests, means a considerable reduction of the critical concentration of oxygen, neither this method is to be recommended. According to the present invention this problem has been solved in the following way. In addition to raw-gas preheated to 150–250° C. also not preheated gas may be supplied to each reactor. This gas is supplied through a conduit 12. To reactor R1, however, substantially only preheated raw-gas and also preheated return gas is supplied. The proportions between these gases is so accommodated that the oxygen percentage in reactor R1 is below the critical concentration, that is half of each if the gas mentioned above is treated. Thereby, the increase in temperature will automatically be kept within permitted limits. Further to the product from reactor R1 a mixture of preheated and not preheated raw-gas is supplied to reactor R2, the mixture being so proportioned that the gas mixture entering reactor R2 obtains a temperature corresponding to the optimum temperature. The total amount of raw-gas is in the present example 14%. Analogously, the temperature of gas mixture entering the reactors R3 and R4 is kept at optimum value. In this manner the reaction heat is utilized for heating the gas and the process can be carried out with a minimum of heat exchanger surface and fuel consumption.

In Fig. 2 another embodiment of the reactor founded on the same principle is illustrated. Four reactor sections are mounted one directly on top of the other which means a considerable saving in material. The invention is, however, not limited to 4 reactor sections but may comprise an optional number. Each reactor section is so dimensioned that the period of contact time and the ratio height:diameter of the catalyst mass are constant. A reactor section consists of a cylinder 21 flanged at both ends 22, 23. The cylinder may be made of iron and may with advantage be lined with refractory bricks or with a refractory cement mass but it may also be made of heat-resisting or acidproof steel. Each reactor section comprises a carrier ring 28 supporting a grid or grate 29. Upon the grid or grate rests a bed of ceramic pieces, for instance, so-called Raschig rings 30 upon which finally the catalyst bed 31 rests. Upon the catalyst bed a further layer of ceramic pieces 32 ultimately rests. Each cylinder is furthermore provided with a lateral inlet 24 located somewhat above the upper portion of the catalyst bed. The uppermost reactor section R1, however, has no lateral inlet and gas is instead introduced through the top stud 25. The lowermost reactor section R4 is furthermore provided with a lateral outlet 26 positioned below the catalyst bed and a stud 27 at the bottom of the cylinder.

The mode of operation of the apparatus is briefly the following. Raw-gas preheated to the optimum temperature is supplied through conduit 1 and a portion thereof is introduced at the top of reactor R1. Here it is possible also to introduce through ventilator 4 and conduit 3 oxygen-free product gas or through conduit 5 oxygen-free gas of some other kind. The gas mixture first passes the layer of ceramic pieces whereby an improved mixing and equalization of temperature is attained. Then the oxygen is burnt in the catalyst mass 31. The product continues immediately into the reactor section R2 and is mixed in the space above the catalyst bed with preheated raw-gas from conduit 1 and not preheated raw-gas from conduit 12 in such proportions that desired temperature and oxygen concentration are obtained in the mixture. It is particularly in this and following reactor sections that the layer of ceramic pieces facilitates complete mixing and temperature equalization. The supply to the reactor sections R3 and R4 occurs analogously. After the last reactor section R4 the product is discharged through stud 26. Polymerisate, sulphur, or other liquid products that may have been formed at the reaction are separated in the lower portion of reactor section R4 and is emptied through stud 27.

The carrier component of the catalyst mass may be made of alumina, silica gel, synthetic or natural aluminum silicate, and magnesium oxide or a mixture of one or more thereof.

What is claimed is:

1. A process for the removal of free oxygen from a raw-gas containing free hydrogen, hydrogen sulphide and free oxygen by means of a sulphidic catalyst which accelerates the reaction between oxygen and hydrogen to form water, the concentration of oxygen of said raw-gas being so high as to cause at a reaction temperature between 150° C. and 350° C. an amount of sulphur to be formed per unit of time by the oxidation of hydrogen sulphide with oxygen in excess of the amount of sulphur simultaneously removed by evaporation and by reduction with hydrogen, comprising mixing such raw-gas with a diluting gas having so low a concentration of oxygen as to render the mixture of raw-gas and diluting gas so low in oxygen concentration as not to cause such a formation of sulphur as said raw-gas, and contacting said gas mixture with said catalyst at a temperature between 150° C. and 350° C.

2. A process as claimed in claim 1, characterized in providing a plurality of reaction bodies containing said catalyst, supplying a mixture of said raw-gas and a diluting gas to each of said bodies, said mixture having an oxygen percentage below said critical concentration, and extracting from each body a gas freed from oxygen, the diluting gas for at least one of said reaction bodies containing return gas freed from oxygen in an earlier stage of the process.

3. A process as claimed in claim 2, in which said reaction bodies are arranged in series and the gas extracted from one body of the series is mixed with the raw-gas supplied to the next body of the series as diluting gas.

4. A process as claimed in claim 3, in which gas extracted from at least one of said reaction bodies is mixed with the raw-gas supplied to the first body of the series of bodies.

5. A process as claimed in claim 1, characterized in providing a plurality of reaction bodies, containing said catalyst, arranged in series, supplying a mixture of said raw-gas and a diluting gas to the serially first of said bodies, said mixture having an oxygen content less than said critical concentration, extracting from said first body a gas freed from oxygen, mixing gas extracted from said first body as diluting gas with a further portion of the raw-gas supplied to the next body in series, and mixing gas, freed from oxygen, extracted from the last body in series as diluting gas with the raw-gas supplied to the serially first of said bodies.

6. A process as claimed in claim 1, characterized in providing a series of reaction bodies containing said catalyst, supplying to the first body a mixture of a portion of said raw-gas and a quantity of a diluting gas of the character stated sufficient for making the oxygen percentage of the mixture lower than said critical concentration, passing said mixture into contact with said catalyst of said first body and then extracting it, freed from oxygen, from this body, the gas extracted from the first body being mixed with only so great another portion of said raw-gas to form a second mixture that the oxygen percentage of said second mixture is still below said critical concentration, passing said second mixture into contact with the catalyst of the second body of said series and then extracting it, freed from oxygen, from this body, the gas extracted from the second body being mixed with a third portion of the raw-gas and treated as described with reference to the second body etc. until all raw-gas is consumed.

7. A process as claimed in claim 1 characterized in that the gas mixture is contacted with a catalyst mass consisting essentially of a first catalyst component selected from the group consisting of the oxides and sulphides of molybdenum and tungsten, a second catalyst component selected from the group consisting of the oxides and sulphides of iron, cobalt, nickel, chromium, vanadium, and uranium, and a carrier component which is an oxidic compound of an element of the periodic system having an atomic number of from 13 to 14, said carrier component being selected from the group consisting of alumina, silica gel, synthetic and natural aluminium silicates and mixtures thereof, the major portion of the catalyst mass consisting of the carrier component and the amounts of said first catalyst component and said second catalyst component being of the same order, the atomic ratio between the metals in the first catalyst and second catalyst components and said element of the carrier component being within the limits 1–10:1–10:10–100.

8. The process defined in claim 7, in which the atomic ratio between the metals in the first catalyst and second catalyst components and said element of the carrier component are within the limits 0.5–1.5:0.5–1.5:10.

9. A process as claimed in claim 1 characterized in that the raw-gas is diluted with a diluent selected from the group consisting of steam, natural gas, and cracking gas and mixtures thereof.

10. A process as claimed in claim 1 characterized in that the raw-gas is supplied to the reaction step in one preheated portion and one not preheated portion, the relative quantities of these portions being accommodated according to the temperature and the quantity of the admixing gas poor in oxygen so that the temperature of the gas mixture is at least about 150° C. at the entrance to the step and not more than about 350° C. at the exit therefrom.

11. A process as claimed in claim 1 characterized in that the reaction is carried out in a plurality of steps and in that the number of steps and the quantity of gas poor in oxygen supplied to the first step are so accommodated that the temperature of the gas at the exit of each step is not more than 350° C.

References Cited in the file of this patent

UNITED STATES PATENTS

| | | |
|---|---|---|
| 1,787,795 | Porter | Jan. 6, 1931 |
| 1,960,212 | Walker | May 22, 1934 |
| 2,024,393 | Sexauer | Dec. 17, 1935 |
| 2,193,278 | Griffith et al. | Mar. 12, 1940 |
| 2,388,451 | Tobiasson | Nov. 6, 1945 |
| 2,426,483 | Boucher | Aug. 26, 1947 |
| 2,475,855 | Peters | July 12, 1949 |
| 2,510,189 | Nahin | June 6, 1950 |

FOREIGN PATENTS

| | | |
|---|---|---|
| 587,070 | Great Britain | Apr. 14, 1947 |